US012562533B2

(12) United States Patent
Duan et al.

(10) Patent No.: US 12,562,533 B2
(45) Date of Patent: Feb. 24, 2026

(54) PROTECTIVE CAGE ASSEMBLY, RECEPTACLE CONNECTOR AND CONNECTOR ASSEMBLY WITH IMPROVED LIGHT GUIDE PIPE

(71) Applicant: DONGGUAN LUXSHARE TECHNOLOGIES CO., LTD, Dongguan (CN)

(72) Inventors: Baiyu Duan, Dongguan (CN); Rongzhe Guo, Dongguan (CN); Hongji Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 363 days.

(21) Appl. No.: 18/195,122

(22) Filed: May 9, 2023

(65) Prior Publication Data

US 2024/0106173 A1     Mar. 28, 2024

(30) Foreign Application Priority Data

Sep. 27, 2022    (CN) ......................... 202222566773.9

(51) Int. Cl.
| | |
|---|---|
| *H01R 13/659* | (2011.01) |
| *F21V 8/00* | (2006.01) |
| *H01R 13/6581* | (2011.01) |
| *H01R 13/6585* | (2011.01) |
| *H01R 13/717* | (2006.01) |
| *H01R 13/641* | (2006.01) |
| *H01R 13/6586* | (2011.01) |

(52) U.S. Cl.
CPC ......... *H01R 13/659* (2013.01); *G02B 6/0008* (2013.01); *H01R 13/7172* (2013.01); *H01R 13/641* (2013.01); *H01R 13/6581* (2013.01); *H01R 13/6585* (2013.01); *H01R 13/6586* (2013.01)

(58) Field of Classification Search
CPC ................ H01R 13/659; H01R 13/641; H01R 13/172; H01R 13/6581; H01R 13/6585; H01R 13/6586; H01R 13/6587; H01R 13/7172; G02B 6/0008
USPC ....... 385/92–94, 146; 116/286–288, 36, 32.1
See application file for complete search history.

(56) References Cited

U.S. PATENT DOCUMENTS

| | | | | |
|---|---|---|---|---|
| 6,302,551 | B1 * | 10/2001 | Matumoto ............. | B60K 35/20 |
| | | | | 362/489 |
| 11,251,573 | B2 | 2/2022 | Wu et al. | |
| 11,448,837 | B2 * | 9/2022 | Duan ................... | H05K 9/0058 |
| 12,199,381 | B2 * | 1/2025 | Yen ...................... | H01R 13/518 |

* cited by examiner

*Primary Examiner* — Renee S Luebke
*Assistant Examiner* — Paul D Baillargeon
(74) *Attorney, Agent, or Firm* — Birch, Stewart, Kolasch & Birch, LLP

(57) ABSTRACT

A protective cage assembly includes a cage and a light guide pipe. The light guide pipe includes an input surface, an output surface and a main body portion extending between the input surface and the output surface. The main body portion includes a first portion and a second portion. The first portion is located inside the cage. The second portion is located outside the cage. The first portion is located adjacent to an inner wall of the cage, and extends along the inner wall of the cage at least to a mating end face of the cage. Besides, a receptacle connector and a connector assembly having the protective cage assembly are also disclosed.

20 Claims, 10 Drawing Sheets

134          123

A          A

A–A

231

233

232

231    β    233    232

PROTECTIVE CAGE ASSEMBLY, RECEPTACLE CONNECTOR AND CONNECTOR ASSEMBLY WITH IMPROVED LIGHT GUIDE PIPE

CROSS-REFERENCE TO RELATED APPLICATION

This patent application claims priority of a Chinese Patent Application No. 202222566773.9, filed on Sep. 27, 2022 and titled "PROTECTIVE CAGE ASSEMBLY, RECEPTACLE CONNECTOR AND CONNECTOR ASSEMBLY", the entire content of which is incorporated herein by reference.

TECHNICAL FIELD

The present disclosure relates to a protective cage assembly, a receptacle connector and a connector assembly, which belong to the field of connectors.

BACKGROUND

A receptacle connector suitable for being mounted on a printed circuit board (PCB) generally includes a protective cage assembly and a connector located in the protective cage assembly, which is generally used to connect two electrical communication devices. In order to conveniently know the connection status between the electrical communication devices, indicators, such as light-emitting diodes, are usually provided on the printed circuit board. Correspondingly, the protective cage assembly includes a light guide pipe. The light guide pipe transmits a light signal of the light-emitting diode to a front end of the receptacle connector, which is convenient for a sensor or a user to obtain the signal.

With the development of technology, the heat dissipation demand in the receptacle connector is getting higher and higher, and a space in the protective cage assembly needs to be more and more inclined to arrange heat dissipation components. In addition, the protective cage assembly itself also tends to be miniaturized, which puts forward higher requirements on the arrangement of various components in the protective cage, especially the arrangement of the light guide pipe.

SUMMARY

An object of the present disclosure is to provide a protective cage assembly, a receptacle connector and a connector assembly, in which a light guide pipe occupies less space in the protective cage assembly, the receptacle connector and the connector assembly.

In order to achieve the above object, the present disclosure adopts the following technical solution: a protective cage assembly, including: a cage; and a light guide pipe including an input surface, an output surface and a main body portion extending between the input surface and the output surface, the main body portion including a first portion and a second portion, the first portion being located inside the cage, the second portion being located outside the cage; wherein the first portion is located adjacent to an inner wall of the cage, and extends along the inner wall of the cage at least to a mating end face of the cage.

In order to achieve the above object, the present disclosure adopts the following technical solution: a receptacle connector, including: a protective cage assembly including: a cage including an end face and an accommodating space;

and a light guide pipe including an input surface, an output surface and a main body portion extending between the input surface and the output surface, the main body portion including a first portion, a second portion and a third portion connected between the first portion and the second portion, the first portion being located inside the cage, the second portion being located outside the cage, and the third portion passing through a side wall of the cage; and wherein the first portion is located adjacent to an inner surface of the side wall, and extends along the inner surface of the side wall at least to the end face of the cage; and a connector located in the accommodating space and away from the end face of the cage.

In order to achieve the above object, the present disclosure adopts the following technical solution: a connector assembly, including: a receptacle connector including a protective cage assembly and a connector, the protective cage assembly including: a cage; and a light guide pipe including an input surface, an output surface and a main body portion extending between the input surface and the output surface, the main body portion including a first portion and a second portion, the first portion being located inside the cage, the second portion being located outside the cage; wherein the first portion is located adjacent to an inner wall of the cage, and extends along the inner wall of the cage at least to a front face of the cage; the connector is located in a rear of the cage of the protective cage assembly and away from the front face of the cage; and a plug connector at least partially inserted into the cage of the protective cage assembly of the receptacle connector so as to be electrically connected with the connector.

Compared with the related art, the present disclosure has the following advantages:

the light guide pipe located inside the cage of the protective cage assembly abuts against or is located adjacent to an inner wall of the cage, and extends along the inner wall of the cage at least to the mating end face of the cage, so that the light guide pipe occupies a small space in the cage and saves the space in the cage.

DETAILED DESCRIPTION

Figure 1:
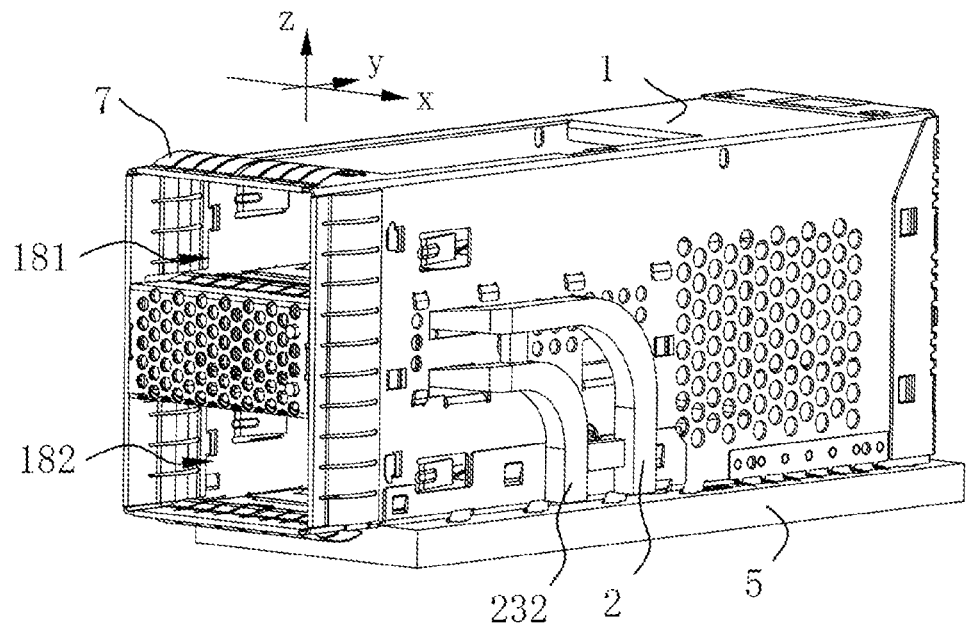
FIG. 1 is a schematic structural view of a receptacle connector mounted on a printed circuit board in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

In the embodiments shown in the present disclosure, an x-axis direction is a third direction, a y-axis direction is a first direction, and a z-axis direction is a second direction. Specific embodiments of the present disclosure will be described below with reference to the accompanying drawings.

The present disclosure discloses a protective cage assembly including a cage 1 and at least one light guide pipe 2.

Figure 2:
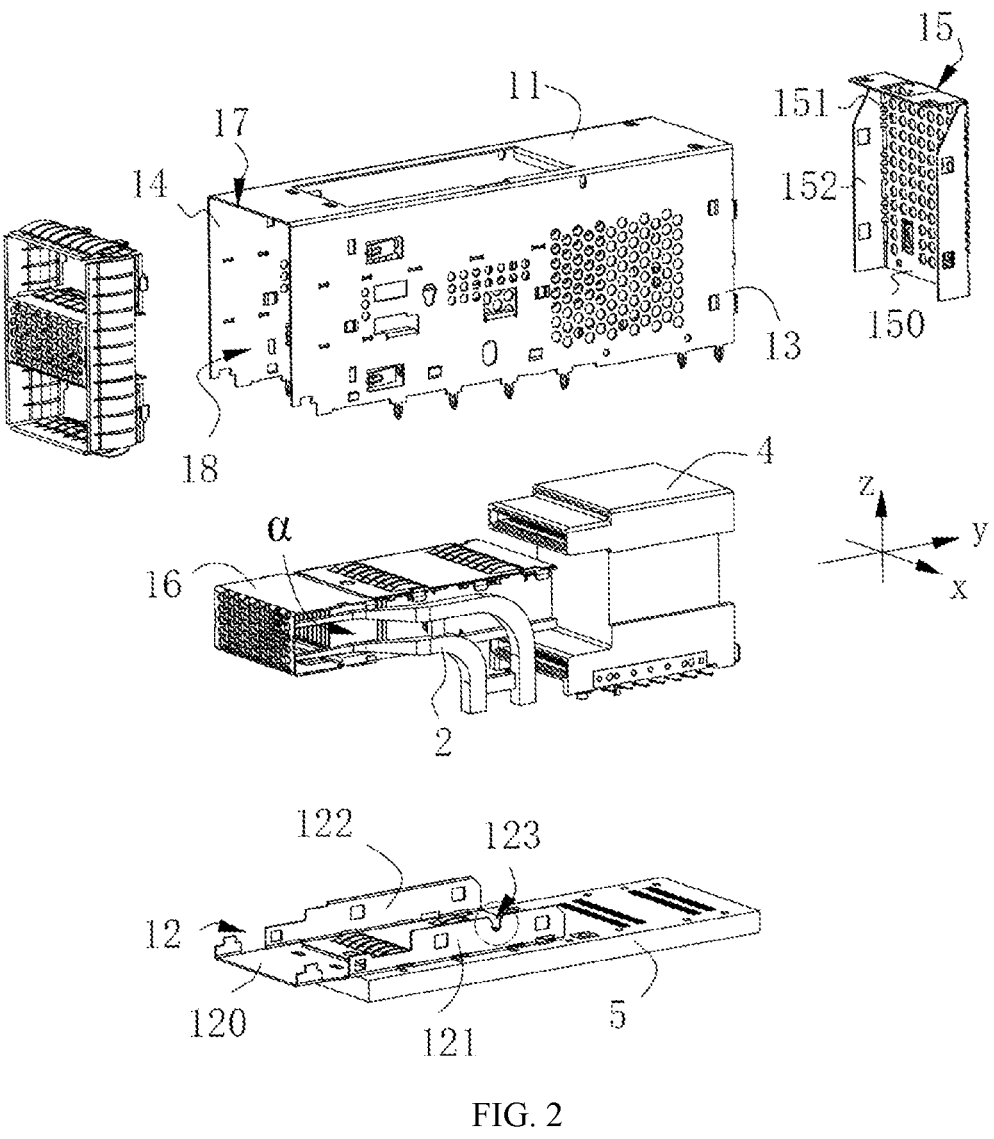
FIG. 2 is an exploded schematic view of the receptacle connector and the printed circuit board in accordance with the embodiment of the present disclosure.
Figure 3:
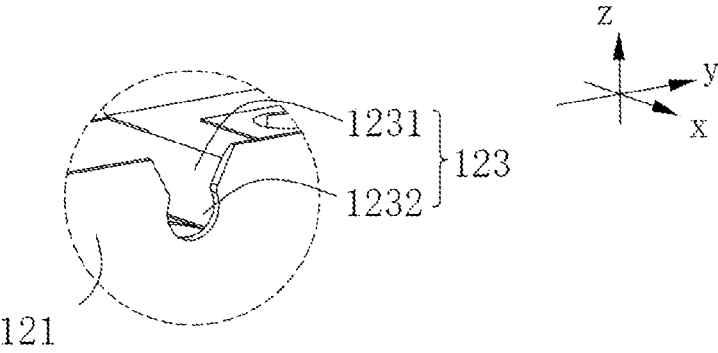
FIG. 3 is a partial enlarged view of FIG. 2.
Figure 16:
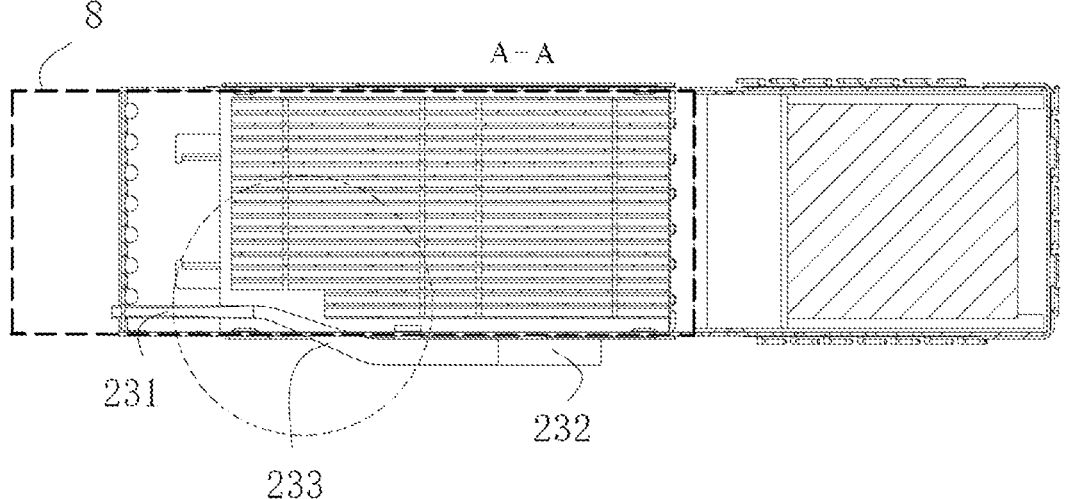
FIG. 16 is a cross-sectional view taken along line A-A of FIG. 13, further showing a plug connector in a dashed box.

Referring to FIG. 1 and FIG. 2, the cage 1 includes a mating end face 17 and an accommodating space 18 extending through the mating end face 17. The connector 4 is located at a rear end of the accommodating space 18 along a positive direction of the y-axis direction and away from the mating end face 17. The accommodation space 18 at a front end of the connector 4 is configured to accommodate a plug connector 8 (see FIG. 16). The plug connector 8 is mated with the connector 4 to realize signal transmission. The cage 1 can play a certain shielding function to improve the quality of the signal transmission.

The cage 1 includes a top wall 11, a bottom wall 12, a first side wall 13 and a second side wall 14. The accommodating space 18 is enclosed by the top wall 11, the bottom wall 12, the first side wall 13 and the second side wall 14. The top wall 11 and the bottom wall 12 are arranged in parallel at intervals. Two sides of the top wall 11 (the sides indicated by the x-axis direction) extend toward the bottom wall 12 along the z-axis direction so as to form the first side wall 13 and the second side wall 14, respectively. The top wall 11, the first side wall 13 and the second side wall 14 extend along the y-axis, in which one end extends to the mating end face 17 and becomes part of the mating end face 17, and another end extends to a rear end of the protective cage assembly.

A plurality of first positioning grooves 131 are provided on both the first side wall 13 and the second side wall 14. The first positioning grooves 131 of the first side wall 13 are set corresponding to the first positioning grooves 131 of the second side wall 14.

The plurality of first positioning grooves 131 on the first side wall 13 or the second side wall 14 are arranged in two rows. The two rows of the first positioning grooves 131 are located in a middle portion of the side wall in the z-axis direction, and each row is parallel to the y-axis. The first positioning grooves 131 in a first row are closer to the top wall 11, and the first positioning grooves 131 in a second row are closer to the bottom wall 12.

First positioning tabs 132 are correspondingly disposed on the first side wall 13 and the second side wall 14. In the embodiment, the first side wall 13 and the second side wall 14 are both provided with two first positioning tabs 132. The first positioning tab 132 is bent from the side wall and extends into the accommodating space 18. In the z-axis direction, the first positioning tab 132 is located adjacent to the first positioning groove 131 in the second row.

A first assembly hole 133 is provided on the first side wall 13. The first assembly hole 133 includes a snap-in portion 1331, a locking portion 1332 and a neck portion 1333. In an embodiment, the first assembly hole 133 is a through hole. The snap-in portion 1331 is a partial circular hole with a diameter of d1, and the locking portion 1332 is a partial circular hole with a diameter of d2, wherein d1 is greater than d2. The neck portion 1333 is a connecting portion of the snap-in portion 1331 and the locking portion 1332, and is also an intersection of the circular hole to which the clip portion 1331 belongs and the circular hole to which the locking portion 1332 belongs. A connecting direction of a center of the snap-in portion 1331 and a center of the locking portion 1332 is a locking direction (the locking direction is the z-axis direction in the embodiment). Perpendicular to the locking direction, a minimum dimension s of the neck portion 1333 (that is, a common chord length of the circle with the diameter d1 and the circle with the diameter d2) is smaller than d2.

In the embodiment shown in the drawings, both the snap-in portion 1331 and the locking portion 1332 are parts of circular through holes. In other embodiments, the snap-in portion 1331 and the locking portion 1332 may also be square through holes or through holes of other shapes. The locking direction is a moving direction of a corresponding locking piece from the snap-in portion 1331 to the locking portion 1332. In a direction perpendicular to the locking direction, the minimum dimension of the neck portion 1333 is smaller than a maximum dimension of the locking portion 1332 in the same direction.

Figure 4:
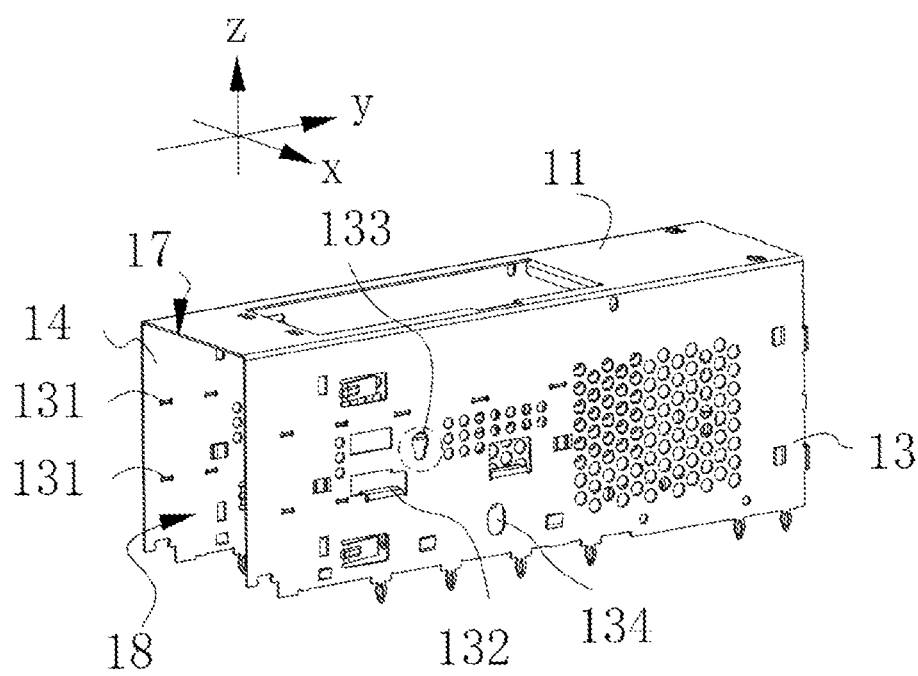
FIG. 4 is a schematic structural view of part of a cage.
Figure 5:
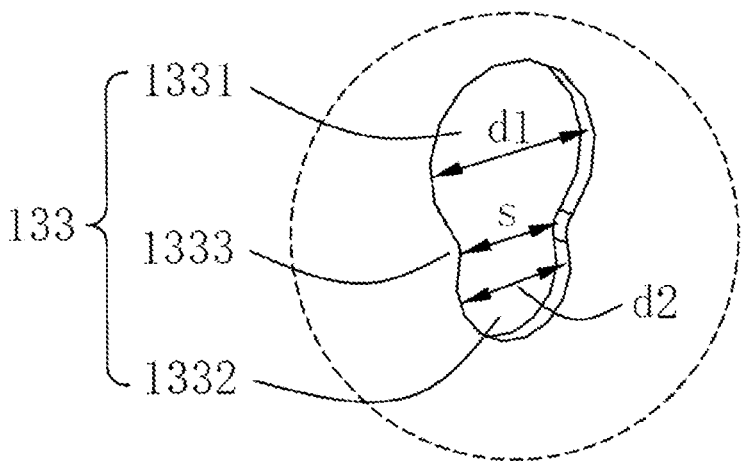
FIG. 5 is a partial enlarged view of FIG. 4.

As shown in FIG. 4, in the z-axis direction, the first assembly hole 133 are located between the first positioning grooves 131 in the first row and the first positioning grooves 131 in the second row.

A second assembly hole 134 is further provided on the first side wall 13, and the second assembly hole 134 is an oval hole.

As shown in FIG. 4, known structures such as heat dissipation holes and ground pins are also provided on the side wall of the cage 1, which will not be described here.

Referring to FIG. 2, the bottom wall 12 includes a bottom wall body portion 120, a first extension wall 121 and a second extension wall 122. Two sides of the bottom wall body portion 120 (the sides indicated by the x-axis direction) extend for a certain distance toward the top wall 11 along a positive direction of the z-axis so as to form the first extension wall 121 and the second extension wall 122. When the top wall 11, the first side wall 13, the second side wall 14 and the bottom wall 12 are assembled together, the first extension wall 121 and the second extension wall 122 rest on an outer surface of the first side wall 13 and an outer surface of the second wall 14, respectively. The first extension wall 121 and the second extension wall 122 are engaged with the first side wall 13 and the second wall 14, respectively by engaging structures. The bottom wall 12 extends along the y-axis direction. One end of the bottom wall 12 extends to the mating end face 17 and becomes part of the mating end face 17, and the other end of the bottom wall 12 extends to a position adjacent to the connector 4.

The bottom wall 12 is provided with an opening groove 123, and the opening groove 123 extends through the first extension wall 121 along the x-axis direction. The opening groove 123 is opened toward the positive direction of the z-axis, and includes a guide portion 1231 and an accommodating portion 1232. A width of the guide portion 1231 in a negative direction of the z-axis (a groove width in the y-axis direction) gradually decreases, and a width of the accommodating portion 1232 in the negative direction of the z-axis first increases and then decreases until it reaches zero. Viewed along the negative direction of the x-axis, the accommodating portion 1232 is a partially circular hole.

Figure 12:
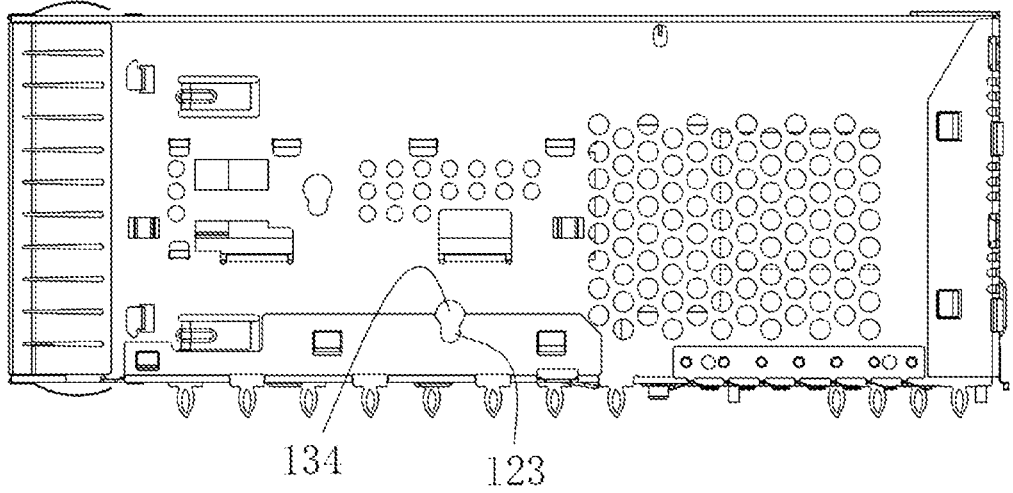
FIG. 12 is a schematic side view of part of the structure of the protective cage assembly of the present disclosure.

Referring to FIG. 12, after the bottom wall 12 is engaged with the top wall 11, the first side wall 13 and the second side wall 14, the opening groove 123 is mated with the second assembly hole 134, so that viewed at one end of the x-axis, the overall structure is similar to that of the first assembly hole 133. The guide portion 1231 of the opening groove 123 corresponds to the neck portion 1333 of the first assembly hole 133. The accommodating portion 1232 of the opening groove 123 corresponds to the locking portion 1332. The difference between the two is that when a corresponding locking piece is mated with the first assembly hole 133, the locking piece will protrude from an inner side of the first side wall 13 and enter the accommodating space 18 when viewed along the x-axis direction. When a corresponding locking element is mated with the second assembling hole 134, the locking element will be accommodated in the second assembling hole 134 (the guide portion 1231 and the accommodating portion 1232 achieve the locking effect on the locking element), and will not protrude from the inner side of the first side wall 13.

Referring to FIG. 2, the cage 1 further includes a rear wall 15. The rear wall 15 includes a rear wall body portion 150 and a third extension wall 152. A plurality of second through holes 151 are formed on the rear wall body portion 150. Each second through hole 151 is a circular hole. Side edges of the rear wall body portion 150 adjacent to the top wall 11, the first side wall 13 and the second side wall 14 extend a distance along a negative direction of the y-axis toward the top wall 11, the first side wall 13 and the second side wall 14 so as to form the third extension walls 152. When the top wall 11, the first side wall 13, and the second side wall 14 are assembled together with the rear wall 15, the third extension walls 152 corresponding to the top wall 11, the first side wall 13 and the second side wall 14 rest on an outer surface of the top wall 11, the outer surface of the first side wall 13 and the outer surface of the second side wall 14, respectively, and are engaged by engaging structures.

Figure 7:
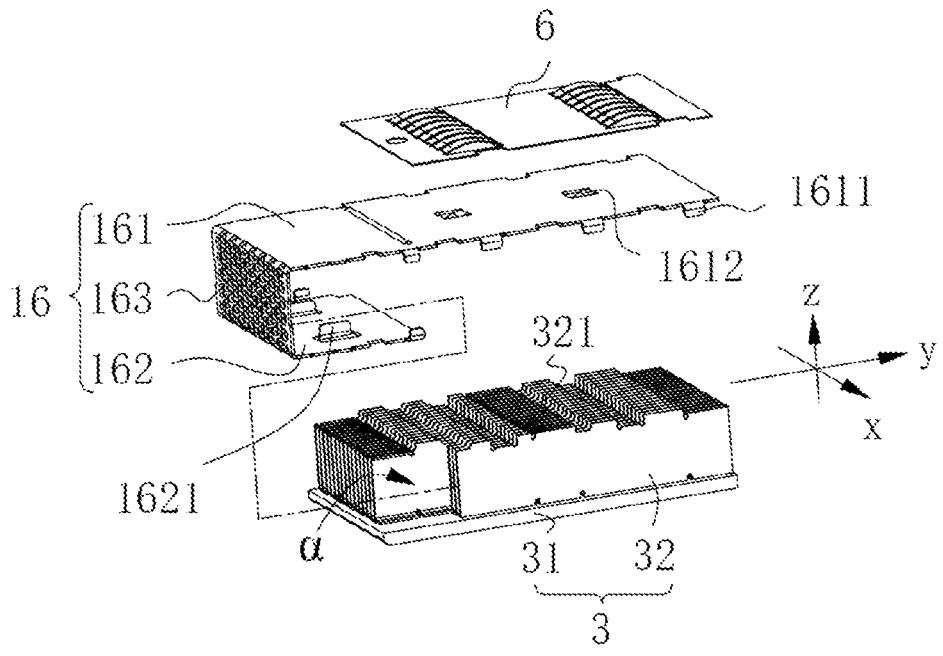
FIG. 7 is an exploded schematic view of part of a structure (an intermediate wall and a heat dissipation plate) in the protective cage assembly of the present disclosure.
Figure 8:
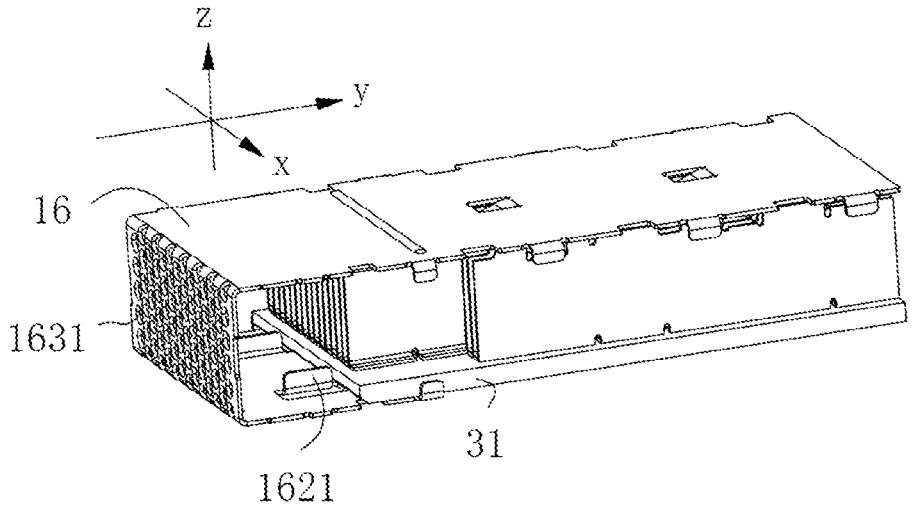
FIG. 8 is a schematic structural view of part of the structure (the intermediate wall and the heat dissipation plate) in the protective cage assembly of the present disclosure.

Referring to FIG. 2, FIG. 7 and FIG. 8, the cage 1 also includes an intermediate wall 16. The intermediate wall 16 includes a first intermediate wall 161, a second intermediate wall 162 and a connecting wall 163 connecting the first intermediate wall 161 and the second intermediate wall 162. The first intermediate wall 161 and the second intermediate wall 162 are arranged in parallel at intervals. In the embodiment, the top wall 11, the bottom wall 12, the first intermediate wall 161 and the second intermediate wall 162 are all parallel, which means main flat plate portions of the components are parallel. The connecting wall 163 has a front end face.

One end of the first intermediate wall 161 extends along the negative direction of the y-axis to the connecting wall 163, and the other end extends along the positive y-axis to a position adjacent to the connector 4. One end of the second intermediate wall 162 extends to the connecting wall 163 along the negative direction of the y-axis, and the other end extends along the positive y-axis for a distance.

In the embodiment, the connecting wall 163 is perpendicular to the first intermediate wall 161 and the second intermediate wall 162, which means that main body plate portions of relevant components are perpendicular. The connecting wall 163, the first intermediate wall 161 and the second intermediate wall 162 are fixedly connected. In an embodiment, the connecting wall 163, the first intermediate wall 161, and the second intermediate wall 162 can be manufactured from a flat plate. In the present disclosure, an integral molding is considered as one of implementation manners of fixed connection. The connecting wall 163 is adjacent to the mating end face of the cage 1 or part of the mating end face of the cage 1.

Further, a plurality of first through holes 1631 are provided on the connecting wall 163, and the first through holes 1631 are circular holes. The first through holes 1631 extend through the front end face of the connecting wall 163.

Locking tabs 1611 protruding outward are provided on sides (e.g., two sides pointed to by the positive and negative directions of the x-axis) of the first intermediate wall 161 and the second intermediate wall 162. The locking tab 1611 cooperates with the first positioning groove 131 located on the side wall to realize a relative fixation of the intermediate wall 16, the first side wall 13 and the second side wall 14.

The protective cage assembly also includes a heat dissipation plate 3. The heat dissipation plate 3 includes a heat dissipation base plate 31 and a plurality of heat dissipation fins 32 fixed to the heat dissipation base plate 31. The plurality of heat dissipation fins 32 are arranged side by side along the x-axis direction.

The heat dissipation fins 32 have a plurality of spaced protrusions 321 in the y-axis direction. The protrusions 321 are protruded along the positive z-axis from part of an upper side of the heat dissipation fins 32 (a side where the z-axis is directed in the positive direction).

One end of the heat dissipation plate 3 adjacent to the mating end surface 17 of the cage 1 is accommodated in a space enclosed by the first intermediate wall 161, the second intermediate wall 162 and the connecting wall 163. A second positioning tab 1621 is provided on the second intermediate wall 162. The second positioning tab 1621 is lifted from a wall of the second intermediate wall 162 toward the first intermediate wall 161. In the present embodiment, two second positioning tabs 1621 are provided. Right end faces (end faces pointed to by the positive direction of the y-axis) of the two second positioning tabs 1621 are aligned. And, the right end surfaces of the two second positioning tabs 1621 abut against a left end surface of the heat dissipation base plate 31 (an end surface indicated by the negative direction of the y-axis). In addition, a third positioning tab 1612 is provided on the first intermediate wall 161. The third positioning tab 1612 is lifted from a wall of the first intermediate wall 161 toward the second intermediate wall 162. A left end face of the third positioning tab 1612 (an end face indicated by the negative direction of the y-axis) abuts against a right end face of a certain protrusion 321. It should be understood that the second positioning tab 1621 and the third positioning tab 1612 position the heat dissipation plate 3 on left and right in the y-axis direction. In the embodiment, two third positioning tabs 1612 are provided and arranged at intervals along the y-axis.

When the heat dissipation plate 3 is assembled in the cage 1, a lower surface of the heat dissipation base plate 31 will abut against an upper surface of the first positioning tab 132. Furthermore, the heat dissipation plate 3 is supported on the plurality of first positioning tabs 132. In addition, the heat dissipation plate 3 is partially accommodated in the space enclosed by the first intermediate wall 161, the second intermediate wall 162 and the connecting wall 163. As a result, the heat dissipation plate 3 is positioned in the z-axis direction.

In the x-axis direction, the heat dissipation plate 3 is positioned in abutment with the first side wall 13 and the second side wall 14 through the heat dissipation base plate 31.

As shown in FIG. 7, part of the heat dissipation fins 32 adjacent to the first side wall 13 are shorter than the rest of the heat dissipation fins 32. One end of the aforesaid part of the heat dissipation fins 32 (in the drawings, an end of the y-axis pointing in the positive direction) extends to one end of the heat dissipation base plate 31 and is flush with the rest of the heat dissipation fins 32. The other end of the afore-mentioned part of the heat dissipation fins 32 extends to a distance from the other end of the heat dissipation base plate 31. A space corresponding to the aforementioned distance is an avoidance space a.

Figure 6:
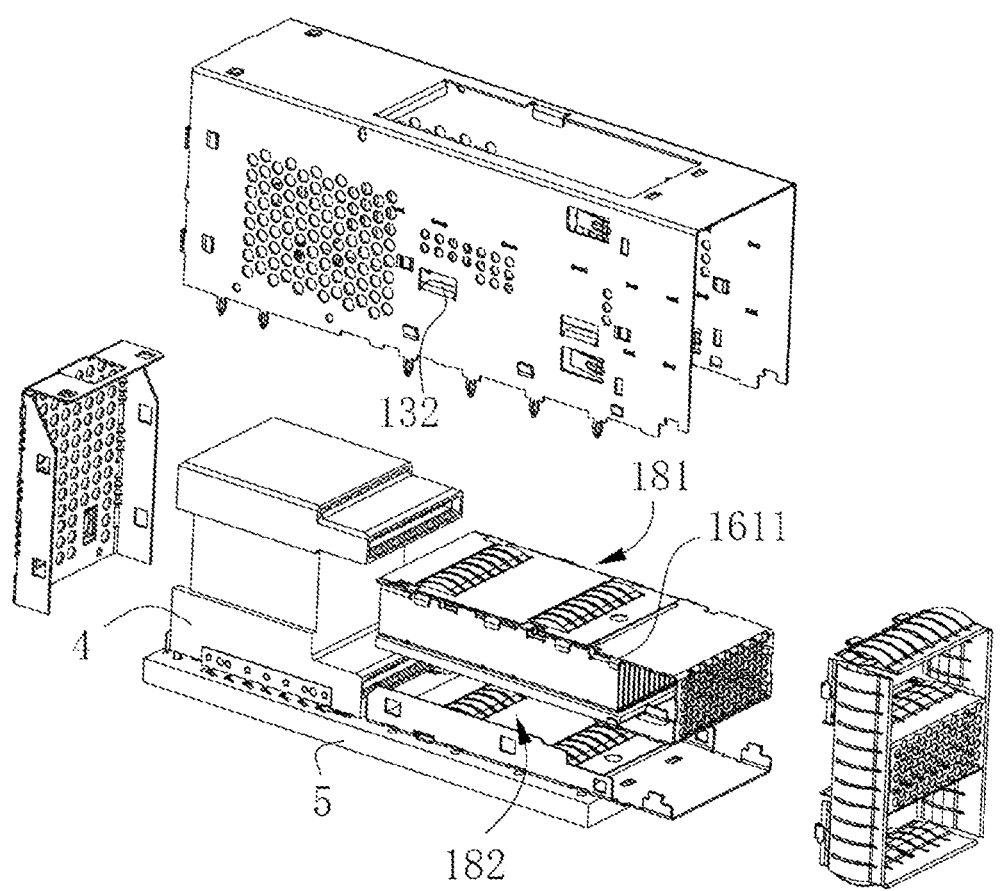
FIG. 6 is a partially exploded schematic view of the receptacle connector and the printed circuit board in accordance with the embodiment of the present disclosure.

Referring to FIG. 1 and FIG. 6, the accommodating space 18 is partitioned by the intermediate wall 16 and the heat dissipation plate 3. A space located on an upper side of the intermediate wall 16 (a side indicated by the positive z-axis) is a first mating space 181. A space located on a lower side of the intermediate wall 16 and the heat dissipation plate 3 is a second mating space 182.

In the embodiment of the drawings, an elastic piece 6 is provided on the upper side of the first intermediate wall 161 (the side indicated by the positive z-axis). The elastic piece 6 is configured to apply a force to the plug connector 8 when the plug connector 8 is inserted into the first mating space 181, so that the plug connector 8 can be in better contact with the heat dissipation plate 3 indirectly or other heat dissipation member (not shown), directly or indirectly. As a result, a better heat dissipation effect of the plug connector 8 can be achieved when it is working.

Figure 9:
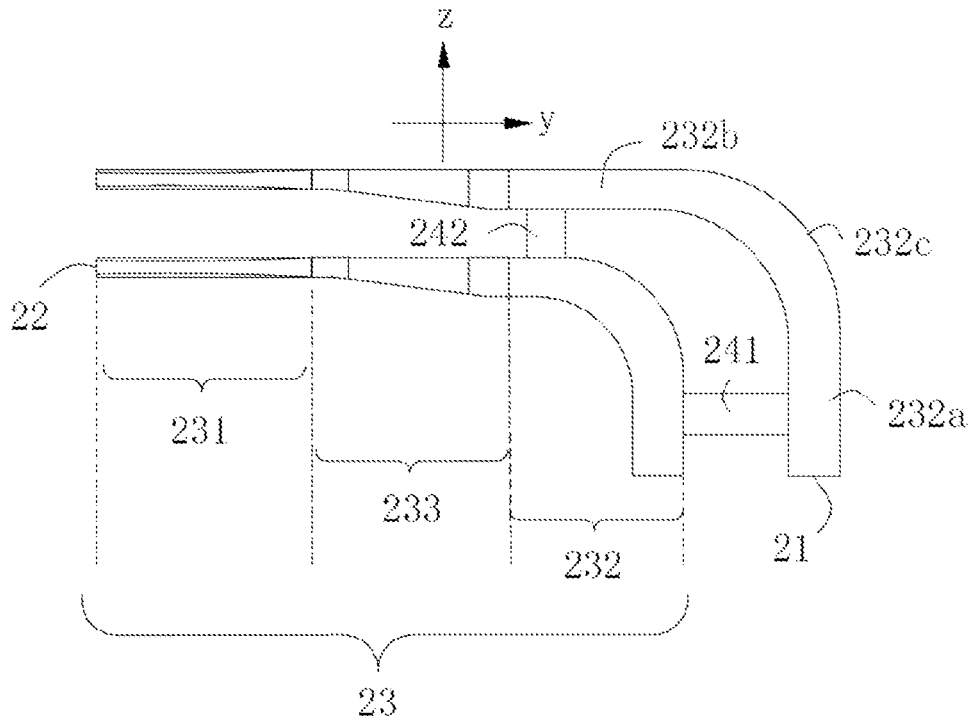
FIG. 9 is a schematic front view of two light guide pipes in the protective cage assembly of the present disclosure.

Referring to FIG. 1, FIG. 2 and FIG. 9, the light guide pipe 2 includes an input surface 21, an output surface 22, and a body portion 23 extending between the input surface 21 and the output surface 22. The input surface 21 is adjacent to a light source on the printed circuit board 5. The light enters the light guide pipe 2 through the input surface 21, and is conducted by the main body portion 23 to the output surface 22.

The main body portion 23 includes a first portion 231 located inside the cage 1, a second portion 232 located outside the cage 1, and a third portion 233 extending through a wall surface of the cage 1.

The first portion 231 is adjacent to the inner side of the first side wall 13 and extends along the y-axis direction. And, the first portion 231 at least extends to be adjacent to the mating end face 17 of the cage 1.

In an embodiment of the present disclosure, the first portion 231 abuts against the inner side of the first side wall 13.

In an embodiment of the present disclosure, a front end surface (the negative direction of the y-axis) of a grounding elastic piece 7 covering the intermediate wall 16 is located on a rear side (the positive direction of the y-axis) of the mating end face 17; and/or, a wall surface of the connecting wall 163 is located on a rear side (the positive direction of the y-axis) of the mating end face 17. In this case, the first portion 231 extends to a position adjacent to the mating end face 17, that is, a light signal can be exposed at least partially through the front end surface of the grounding elastic piece 7 covering the intermediate wall 16 and/or the wall surface of the connecting wall 163, thereby making a user or a sensor receive the light signal.

In another embodiment of the present disclosure, the first portion 231 extends to the mating end face 17.

In another embodiment of the present disclosure, the first portion 231 extends beyond the mating end face 17 of the cage 1. Referring to FIG. 1 and FIG. 2, the first portion 231 extends out of the cage 1 through the first through hole 1631 of the connecting wall 163 to be exposed to the air.

In the embodiment, the first portion 231 is accommodated in the space enclosed by the first intermediate wall 161, the second intermediate wall 162 and the connecting wall 163.

The second portion 232 is adjacent to an outer wall surface of the cage 1. In the embodiment, the second portion 232 abuts against the outer wall surface of the cage 1 and extends along the outer wall surface of the cage 1. The second portion 232 includes a vertical section 232a extending vertically (in the z-axis direction), a horizontal section 232b extending horizontally (in the y-direction), and a reversing section 232c. In the embodiment shown in the drawings, the vertical section 232a extends from bottom to top (in the positive direction of the z-axis). In other embodiments of the present disclosure, the vertical section 232a may also extend from top to bottom, for example, when the light source is located on the upper side. The reversing section 232c connects the horizontal section 232b and the vertical section 232a, and the entire second portion 232 extends in a plane parallel to the first side wall 13.

Figure 13:
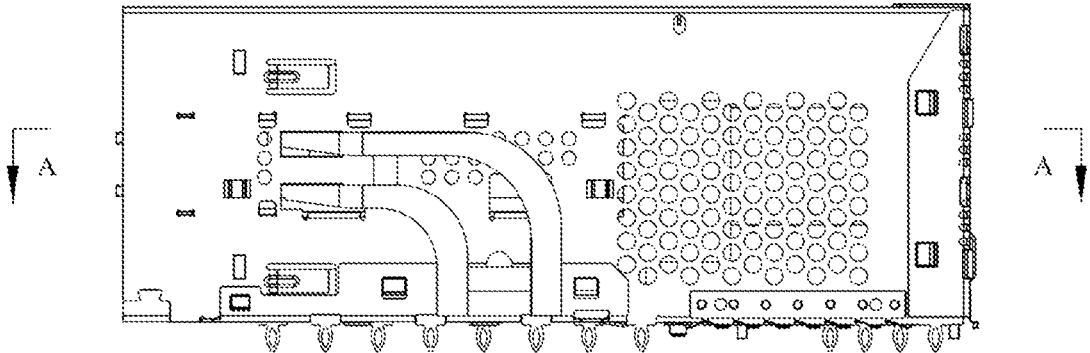
FIG. 13 is a schematic side view of part of the structure of the protective cage assembly of the present disclosure.
Figure 14:
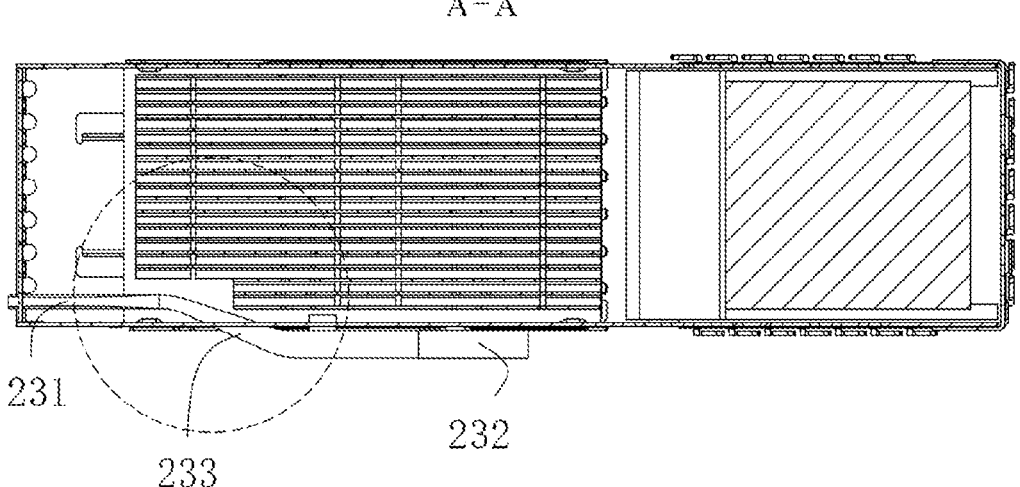
FIG. 14 is a cross-sectional view taken along line A-A of FIG. 13.
Figure 15:
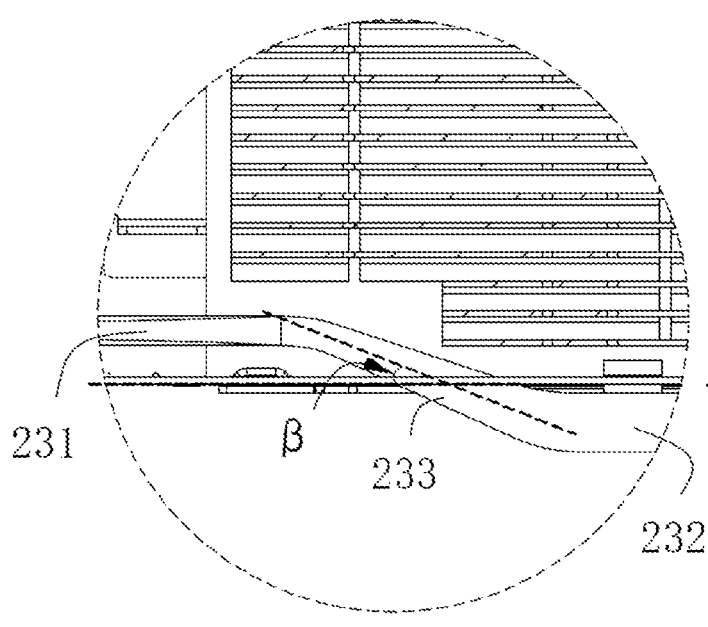
FIG. 15 is a partial enlarged view of FIG. 14.

In the embodiment, two light guide pipes 2 are provided. The vertical sections 232a of the two light guide pipes 2 are arranged at intervals along the y-axis direction. The first portions 231, the third portions 233 and the horizontal sections 232b of the second portions 232 of the two light guide pipes 2 are arranged at intervals along the z-axis direction, respectively. Referring to FIG. 13 to FIG. 15, the third portion 233 of the light guide pipe 2 passes through the cage 1. An included angle β between an extending direction of the third portion 233 and a plane where the wall surface of the cage 1 is located, is less than 30°. In FIG. 15, a horizontal dashed line represents the plane where the outer wall surface of the cage 1 is located, and an inclined dashed line represents the extending direction of the third portion 233.

In an embodiment, an extending direction of the first portion 231 is parallel to an extending direction of the horizontal section 232*b* of the second portion 232. Further, in the illustrated embodiment, in the z-axis direction, the first portion 231 and the horizontal section 232*b* are substantially located at the same height level.

Figure 10:
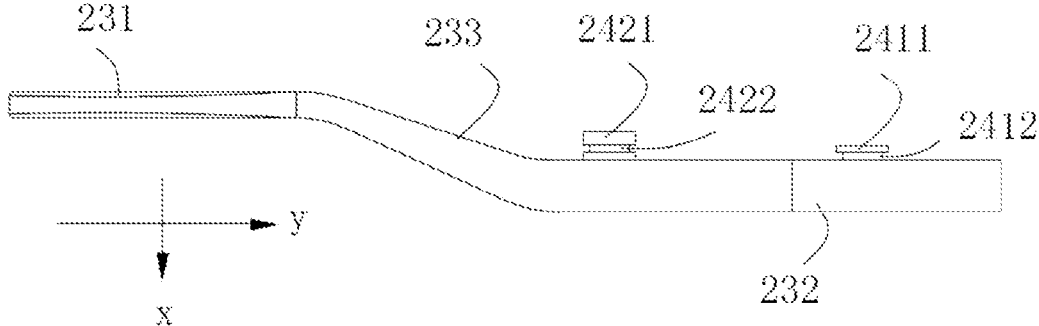
FIG. 10 is a schematic top view of the light guide pipes in the protective cage assembly of the present disclosure.
Figure 11:
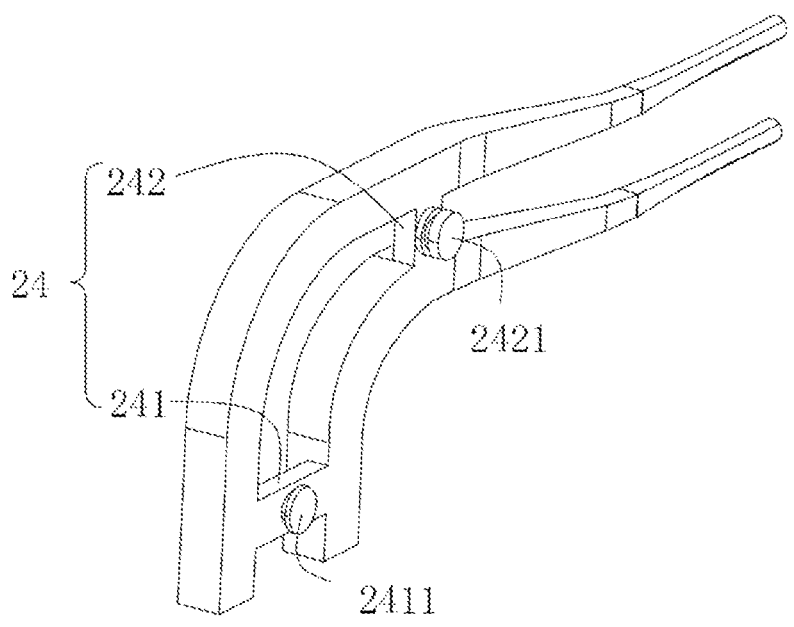
FIG. 11 is a schematic structural view of the light guide pipes in the protective cage assembly of the present disclosure.

Referring to FIG. 9 to FIG. 11, a support member 24 is provided between the two light guide pipes 2. In the embodiment, two support members 24 are provided, which are a first support member 241 and a second support member 242. The first support member 241 is disposed between the vertical sections 232*a* of the two light guide pipes 2. An extending direction of the first support member 241 is perpendicular to an extending direction of the vertical section 232*a*. The second support 242 is disposed between the horizontal sections 232*b* of the two light guide pipes 2. An extending direction of the second support member 242 is perpendicular to an extending direction of the horizontal section 232*b*.

Referring to the drawings, a first locking piece 2411 and a second locking piece 2421 are respectively provided on sides of the first support member 241 and the second support member 242 adjacent to the cage 1. In the embodiment, the first locking piece 2411 and the second locking piece 2421 are both disc-shaped structures. In other embodiments of the present disclosure, the first locking piece 2411 and the second locking piece 2421 may also be a rectangular sheet-like structure or other sheet-like structures, or a strip-like structure or the like. The first locking piece 2411 is connected to the side of the first supporting member 241 adjacent to the cage 1 through the first connecting member 2412. The second locking piece 2421 is connected to the side of the second supporting member 242 adjacent to the cage 1 through the second connecting member 2422. In an embodiment, the first connecting member 2412 and the second connecting member 2422 are both cylindrical structures. In other embodiments of the present disclosure, the first connecting member 2412 and the second connecting member 2422 are prismatic structures or other structures.

The first connecting member 2412 and the second connecting member 2422 protrude toward the cage 1 from a side of the light guide pipe 2 adjacent to the cage 1. The first connecting member 2412 and the second connecting member 2422 protrude to and are fixedly connected the first locking piece 2411 and the second locking piece 2421, respectively.

In the embodiment, a diameter of the second locking piece 2421 is smaller than a diameter of the locking portion 1331 and larger than a diameter of the locking portion 1332. Therefore, the second locking piece 2421 can protrude into an interior of the cage 1 at the snap-in portion 1331 along the x-axis direction. A diameter of the second connecting member 2422 is smaller than the diameter of the snap-in portion 1331, the diameter of the locking portion 1332 and the minimum dimension of the neck portion 1333. Therefore, the second locking piece 2421 can move downwardly along the negative direction of the z-axis. When the second locking piece 2421 is located inside the locking portion 1332, since the diameter of the locking portion 1332 is smaller than the diameter of the second locking piece 2421, the second locking piece 2421 is locked within the locking portion 1332.

Further, the diameter of the second connecting member 2422 is equal to or slightly smaller than the minimum dimension of the neck portion 1333.

In the embodiment, the diameter of the first locking piece 2411 is smaller than the diameter of the second assembly hole 134 (this diameter is a diameter of a semicircular hole at an end of the oval hole), and the diameter of the first locking piece 2411 is larger than the diameter of the accommodating portion 1232. Therefore, the first locking piece 2411 can extend into the cage 1 from the second assembly hole 134 in the x-axis direction, and the diameter of the first connecting member 2412 is equal to or slightly smaller than the smallest opening of the guide portion 1231 in the y-axis direction length. The first locking piece 2411 moves downwardly to the accommodating portion 1232. The first locking piece 2411 cannot move to the outside of the cage 1 relative to the accommodating portion 1232.

After the second locking piece 2421 enters the locking portion 1332 and the first locking piece 2411 enters the accommodating portion 1232, the light guide pipe 2 moves forwardly a certain distance to pass through the connecting wall 163 and then extends out of the mating end face 17 of the cage 1. At this time, the neck portion 1333 prevents the second locking piece 2421 from being separated from the locking portion 1332. Similarly, the guide portion 1231 will also prevent the first locking piece 2411 from being separated from the accommodating portion 1232.

The protective shell assembly also includes a plurality of grounding elastic pieces 7. The grounding elastic pieces 7 cover the top wall 11, the bottom wall 12, the first side wall 13, the second side wall 14 and wall ends of the intermediate wall 16 that are adjacent to the mating end face 17. It should be understood that, for the grounding elastic pieces 7 covering the intermediate wall 16, through holes are correspondingly provided at positions corresponding to the first through holes 1631.

In addition, the present disclosure also discloses a receptacle connector, which includes the protective cage assembly disclosed above and the connector 4. The connector 4 is located at the rear end of the protective cage assembly. It should be understood that the connector 4 communicates with the first mating space 181 and the second mating space 182.

Furthermore, the present disclosure also discloses a connector assembly which includes a receptacle connector and a plug connector 8. The plug connector 8 is illustrated in a dashed box in FIG. 16. The receptacle connector is the receptacle connector disclosed above. The plug connector 8 can at least partially protrude into the first mating space 181 and/or the second mating space 182, and then be electrically connected with the connector 4.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A protective cage assembly, comprising:

a cage; and a light guide pipe comprising an input surface, an output surface and a main body portion extending between the input surface and the output surface, the main body portion comprising a first portion and a second portion, the first portion being located inside the cage, the second portion being located outside the cage;

wherein the first portion is located adjacent to an inner wall of the cage, and extends along the inner wall of the cage at least to a mating end face of the cage;

the second portion comprises a horizontal section, a vertical section and a curved section;

the horizontal section extends along a first direction;

the vertical section extends along a second direction;

the curved section extends between the horizontal section and the vertical section; and the second direction is perpendicular to the first direction.

2. The protective cage assembly according to claim 1, wherein the cage has a first through hole, and the first through hole is a circular hole; and wherein the first portion extends beyond the mating end face through the first through hole.

3. The protective cage assembly according to claim 1, wherein the light guide pipe further comprises a third portion extending between the first portion and the second portion, and the third portion passes through a wall surface of the cage; and wherein an included angle between an extending direction of the third portion and a plane of the wall surface of the cage through which the third portion passes, is less than 30°.

4. The protective cage assembly according to claim 3, wherein the second portion is located adjacent to an outer wall of the cage, and the second portion extends along the outer wall of the cage; and wherein an extending direction of the first portion is parallel to an extending direction of part of the second portion that is located adjacent to the third portion.

5. The protective cage assembly according to claim 1, wherein the cage further comprises a rear end opposite the mating end face, and the cage extends from the mating end face to the rear end along a first direction.

6. The protective cage assembly according to claim 4, wherein a plurality of the light guide pipes are provided; in the plurality of the light guide pipes, the vertical sections of adjacent light guide pipes are arranged at intervals along the first direction; the first portions, the third portions and the horizontal sections of the adjacent light guide pipes are arranged at intervals along the second direction, respectively.

7. The protective cage assembly according to claim 6, wherein in the plurality of the light guide pipes, a support member is connected between the adjacent light guide pipes; the support member comprises a locking pieces locked on the wall of the cage.

8. The protective cage assembly according to claim 7, wherein the support member comprises a first support member and a second support member; the first support member is connected between the vertical sections of two adjacent light guide pipes; and the second support member is connected between the horizontal sections of the two adjacent light guide pipes.

9. The protective cage assembly according to claim 8, wherein the cage comprises a top wall, a bottom wall, a first side wall and a second side wall;

the top wall, the bottom wall, the first side wall and the second side wall are enclosed to form an accommodation space;

the cage further comprises an intermediate wall;

the protective cage assembly further comprises a heat dissipation plate;

the heat dissipation plate is arranged on the intermediate wall;

the first side wall defines a first assembly hole, and the first assembly hole overlaps the heat dissipation plate viewed from one end of a third direction;

the second locking piece located on the second support member is locked on the first side wall through the first assembly hole; and the third direction is perpendicular to the first direction and perpendicular to the second direction.

10. The protective cage assembly according to claim 9, wherein the first assembly hole comprises a snap-in portion, a locking portion and a neck portion;

the second locking piece extends into the accommodating space through the snap-in portion along the third direction; the second locking piece does not pass through the locking portion along the third direction;

the second locking piece moves from the snap-in portion to the locking portion through the neck portion along a locking direction; and in a direction perpendicular to the locking direction, a minimum dimension of the neck portion is smaller than a maximum dimension of the locking portion.

11. The protective cage assembly according to claim 10, wherein the second locking piece is fixedly connected to the second support member through a second connecting member; and wherein in the direction perpendicular to the locking direction, a minimum width of the second connecting member is equal to or slightly smaller than the minimum dimension of the neck portion.

12. The protective cage assembly according to claim 9, wherein the bottom wall comprises a bottom wall body portion, a first extension wall and a second extension wall;

the first extension wall and the second extension wall extend from the bottom wall body portion to the top wall along the second direction; the first extension wall and the second extension wall are wrapped on an outside of the first side wall and the second side wall, respectively;

the first side wall defines a second assembly hole;

the first extension wall defines an opening groove;

viewed from one end of the third direction, the opening groove partially overlaps the second assembly hole; and the first locking piece located on the first support member is locked on the first side wall through the second assembly hole and the opening groove.

13. The protective cage assembly according to claim 12, wherein the opening groove comprises a guide portion and an accommodating portion;

the first locking piece extends into the accommodating space through the second assembly hole along the third direction; the first locking piece does not pass through the accommodating portion along the third direction;

the first locking piece moves from the second assembly hole to the accommodating portion through the guide portion along a locking direction; and in a direction perpendicular to the locking direction, a minimum dimension of the guide portion is smaller than a maximum dimension of the accommodating portion.

14. The protective cage assembly according to claim 13, wherein the first locking piece is fixedly connected to the first support member through a first connecting member; and
wherein in the direction perpendicular to the locking direction, a minimum width of the first connecting member is equal to or slightly smaller than the minimum dimension of the guide portion.

15. The protective cage assembly according to claim 14, wherein the first locking piece is received in the second assembly hole; and viewed along the third direction, the first locking piece does not protrude beyond the inner wall of the cage.

16. A receptacle connector, comprising:
a protective cage assembly comprising:
a cage comprising an end face and an accommodating space; and
a light guide pipe comprising an input surface, an output surface and a main body portion extending between the input surface and the output surface, the main body portion comprising a first portion, a second portion and a third portion connected between the first portion and the second portion, the first portion being located inside the cage, the second portion being located outside the cage, and the third portion passing through a side wall of the cage; and
wherein the first portion is located adjacent to an inner surface of the side wall, and extends along the inner surface of the side wall at least to the end face of the cage; and
a connector located in the accommodating space and away from the end face of the cage;
wherein the second portion is located adjacent to an outer surface of the side wall, and the second portion extends along the outer surface of the side wall;
the first portion extends along a first direction;
the second portion comprises a horizontal section, a vertical section and a curved section connected between the horizontal section and the vertical section;
the horizontal section extends along the first direction;
the vertical section extends along a second direction;
and the second direction is perpendicular to the first direction.

17. The receptacle connector according to claim 16, wherein two light guide pipes are provided, each light guide pipe is of a L-shaped configuration, the vertical sections of the two light guide pipes are arranged at intervals along the first direction; the first portions, the third portions and the horizontal sections of the two light guide pipes are arranged at intervals along the second direction, respectively.

18. A connector assembly, comprising:
a receptacle connector comprising a protective cage assembly and a connector, the protective cage assembly comprising:
a cage; and
a light guide pipe comprising an input surface, an output surface and a main body portion extending between the input surface and the output surface, the main body portion comprising a first portion and a second portion, the first portion being located inside the cage, the second portion being located outside the cage;
wherein the first portion is located adjacent to an inner wall of the cage, and extends along the inner wall of the cage at least to a front face of the cage;
the connector is located in a rear of the cage of the protective cage assembly and away from the front face of the cage; and
a plug connector at least partially inserted into the cage of the protective cage assembly of the receptacle connector so as to be electrically connected with the connector;
wherein the second portion comprises a first section, a second section and a curved section; the first section extends along a first direction; the second section extends along a second direction; the curved section extends between the first section and the second section; and the second direction is perpendicular to the first direction.

19. The connector assembly according to claim 18, wherein the first section is a horizontal section, and the second section is a vertical section.

20. The connector assembly according to claim 18, wherein the light guide pipe further comprises a third portion extending between the first portion and the second portion, and the third portion passes through a wall surface of the cage; and
wherein an included angle between an extending direction of the third portion and a plane of the wall surface of the cage through which the third portion passes, is less than 30°.

* * * * *